Nov. 20, 1962  C. GRIMSHAW  3,065,323
CONDITION RESPONSIVE ELECTRIC SWITCH MECHANISM
Filed June 5, 1959  2 Sheets-Sheet 2
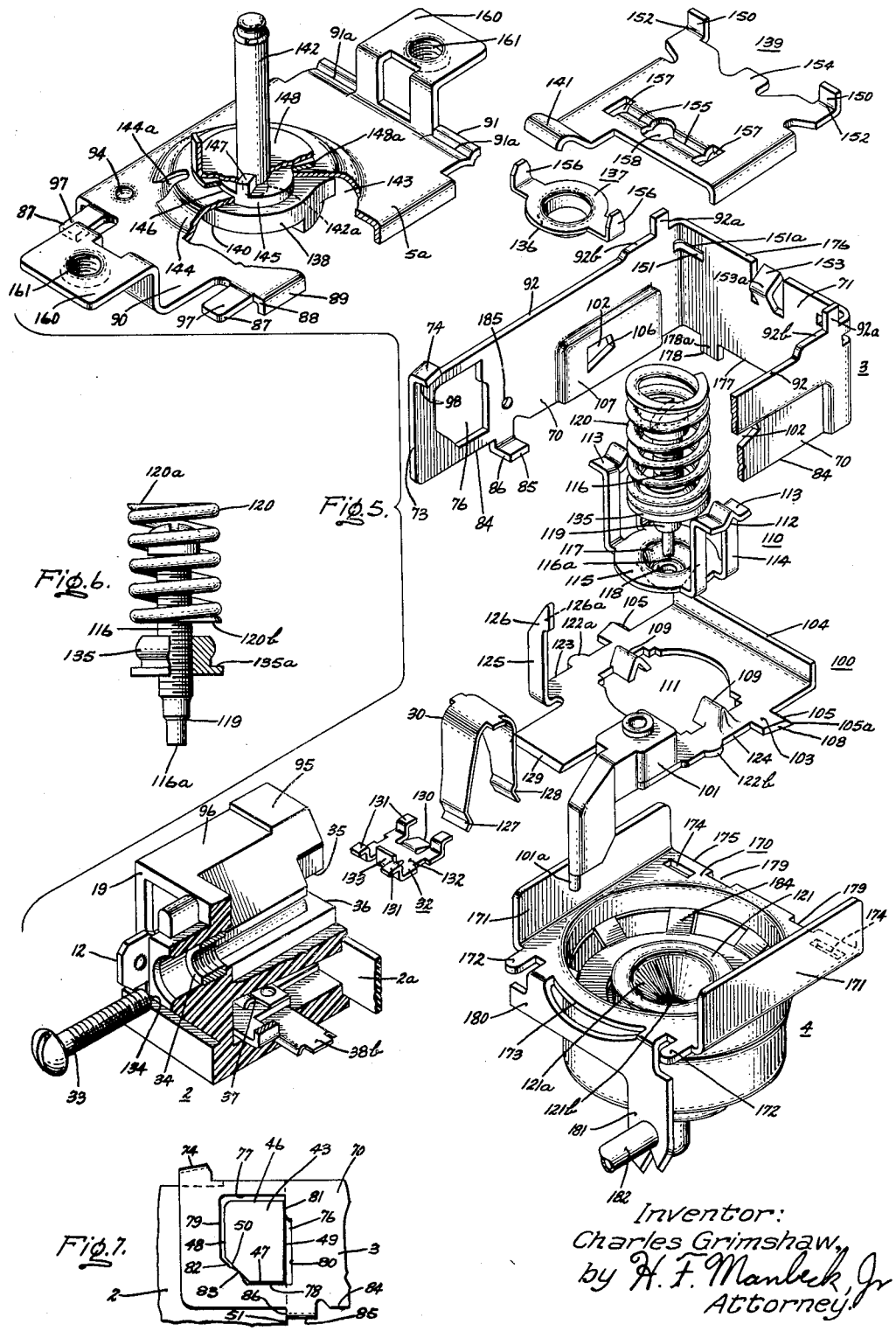
Inventor:
Charles Grimshaw,
by H. F. Manbeck, Jr
Attorney

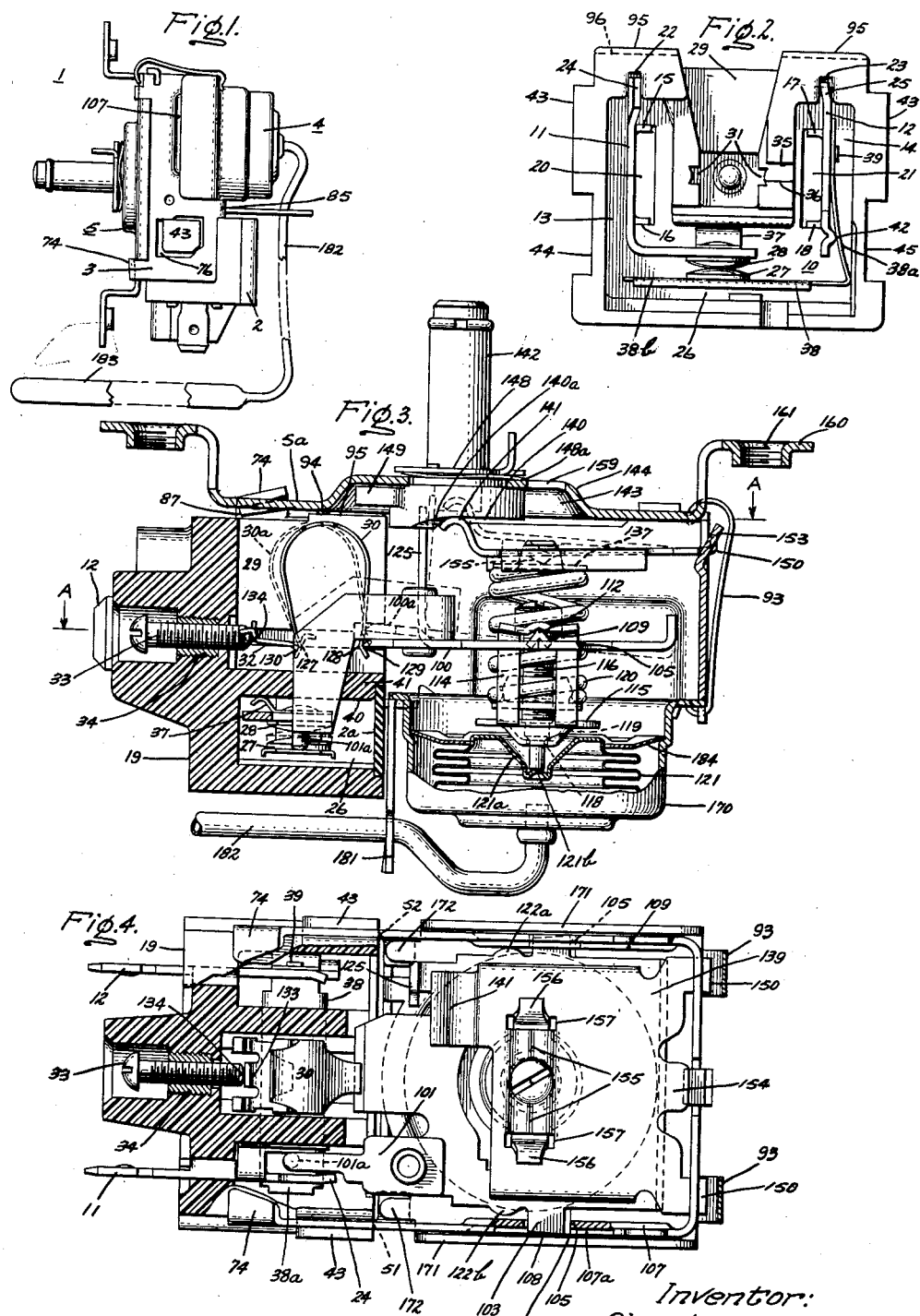

United States Patent Office 3,065,323
Patented Nov. 20, 1962

3,065,323
CONDITION RESPONSIVE ELECTRIC
SWITCH MECHANISM
Charles Grimshaw, Fulton, Ill., assignor to General
Electric Company, a corporation of New York
Filed June 5, 1959, Ser. No. 818,436
6 Claims. (Cl. 200—140)

This invention relates to electric switch mechanisms and is particularly applicable to automatic temperature control switches for use in connection with electric refrigerators.

Refrigerating machines of the conventional types such as household refrigerators, freezers and air conditioning units, are customarily controlled by means of a switch which automatically starts the machine, in response to a first predetermined condition, such as a predetermined upper temperature, and subsequently stops the machine, in response to a second predetermined condition, such as a predetermined lower temperature. In such switches, a condition responsive element, such as a thermally responsive bellows, provides a mechanical force for controlling the circuit of the machine by opening or closing the contacts of the switch.

A common form of such condition responsive electric switches is generally referred to as a "constant differential cold control." Switches of this type are ordinarily constructed to initiate the refrigerating operation at a selectively adjustable upper temperature and subsequently to terminate the refrigerating operation at a predetermined number of degrees below the upper temperature. In this type of switch, adjustment of the upper temperature at which refrigeration is initiated, is accompanied by a corresponding change in the lower temperature at which the refrigeration cycle is terminated. The temperature differential, or the difference in the temperature between initiation and termination of the refrigerating cycle, is preset by a separate adjustment, and remains essentially constant for any one setting throughout the entire temperature range of the switch.

Such a switch is expected to provide reliable and consistent sensitivity with continuous use over a long period of years, and the requirements for it are that it be inexpensive, of sturdy construction, and capable of simplified adjustment of both the predetermined conditions and condition differential to which it is responsive. In the past, such condition responsive switch mechanisms have been relatively complex, thereby adding appreciably to the overall cost. This complexity has necessitated the requirement of maintaining close tolerance control over the numerous component parts of the switch, which is essential in order to provide the necessary sensitivity and reliability for the device. The costs of condition responsive switch mechanisms in the prior art, have reflected substantial expenses due to high labor costs and material costs which result from the large number of parts required and the many shop operations required in assembling the switch. In addition, the precision of the component parts which is required for such a switch, usually eventuates in a switch mechanism of relatively large configuration.

It is, therefore, desirable to provide a condition responsive electric switch mechanism which is simple in construction and easy to assemble, thereby contributing to a substantially lower over-all cost. It is further desirable that such a switch be small in size, thus occupying a minimum space in the refrigerating equipment it is intended to operate. It is additionally desirable that such a switch mechanism be sturdy, have a long life, and provide for close calibration by simplified adjustment means.

Accordingly, it is a primary object of this invention to provide an improved condition responsive electric switch which due to its relative simplicity can be manufactured at a reduced cost.

It is a further object of this invention to provide an improved condition responsive electric switch that is relatively small in size, sturdily constructed, and has a long life.

In carrying out one aspect of my invention, which is directed particularly to a simplified structural arrangement of the control switch, I provide a condition responsive electric switch with its contacts mounted on an insulating base having a pair of ears formed on opposite sides thereof. A U-shaped frame is mounted on the base by means of a tab and a slot formed near the outer end of each of two frame legs, with the slots receiving the ears of the base and with the tabs engaging one end thereof. A contact operating member is pivotally mounted upon the frame to open or close the switch contacts, and an external condition responsive means is also mounted on the switch frame to furnish the requisite force for moving the contact operating member. A cover engages the frame and securely clamps the base thereto, with points of the frame slots in contact with the base ears and the frame tabs firmly engaging the base end.

By further aspects of my invention, additional desirable features may be included in the switch, and the specification concludes with claims particularly pointing out and distinctly claiming the subject matter which I regard as my invention. The invention, however, as to organization and method of operation, together with further objects and advantages thereof, may best be understood by reference to the following description when taken in conjunction with the accompanying drawings, in which:

FIG. 1 is a side elevational view of an improved condition responsive electric switch embodying my invention in one form thereof;

FIG. 2 is an end view of the insulating base of the switch;

FIG. 3 is a side elevational view partially in section and partially broken away, of the switch of FIG. 1, with dotted lines representing certain alternate operating positions of certain movable parts of the switching mechanism;

FIG. 4 is a sectional view taken along the line A—A of FIG. 3;

FIG. 5 is an exploded view showing the various parts of the switch of FIG. 1 with the cover assembly, the base, and the frame, partially broken away;

FIG. 6 is a side elevational view partially in section of the range spring and altitude adjustment assembly of the switch; and, FIG. 7 is a slightly magnified side elevational view of the mounting of the outer end of one leg of the frame of the switch to the insulating base.

Referring now to FIG. 1, there is shown a temperature responsive switch 1 which embodies one form of my invention, and often is also referred to as a "cold control." The switch 1 includes an insulating base 2 which, for example, is formed of molded phenolic thermosetting plastic, and a U-shaped frame 3 which is formed from a suitable material such as stainless steel and is securely mounted to base 2 by a means which, as will be described in detail hereafter, constitutes an important aspect of my invention. Frame 3 conveniently also supports bellows assembly 4, which provides the desired temperature responsive force, and a cover assembly 5 which includes means for mounting the switch upon a suitable supporting panel.

As best shown in FIGS. 2 to 4, insulating base 2 serves as a mounting for terminals 11 and 12, the inner portions of which are contained within a general U-shaped internal cavity 10 of the base. Terminals 11 and 12 are fastened to base 2 at side portions 13 and 14 respectively of cavity 10 by means of flanges 15, 16, 17 and 18. These flanges 15, 16, 17 and 18 have projecting ends which extend outwardly from terminal side 19 of the base through molded slots 20 and 21 and are staked thereto. Recesses 22 and 23 are provided at the top of portions 13 and 14 of the cavity 10, to receive upper portions 24 and 25 of the terminals, each of which is partially bent inwardly (as viewed in FIG. 2) to thereby furnish additional support for the terminals within the base. Contacts 27 and 28 are housed in the lower or bight portion 26 of the cavity 10, and above bight 26 the base includes a centrally disposed upper hollow portion 29, the purpose of which is to provide room for toggle spring 30. This spring, as will be explained hereinafter, is utilized to provide snap action for the switch contacts.

In order to provide a support for adjusting the spring 30, oppositely disposed channels 31 are molded into base 2, and these channels are directed generally perpendicular to terminal side 19 of the base. The channels 31 support a movable pivot member 32 which provides a linearly movable adjustable support for the left side of toggle spring 30 (as viewed in FIG. 3), the pivot member being movable by differential adjusting screw 33 which engages knurled nut 34. Screw 33 is accessible from terminal side 19 of the base. Further, details and advantages of the differential adjustment as provided by screw 33, nut 34 and pivot member 32, shall be described hereinafter and the significant value thereof shall then become more apparent. Besides mounting the toggle spring adjusting means and the switch contacts, the base 2 includes a pair of stops 35 and 36 for limiting the movement of contact operating member or lever 100 of the switch. The action of the lever 100 and its cooperation with stops 35 and 36 will be discussed hereinafter.

Contact 28 of switch 1 is riveted to terminal 11, and is relatively fixed within the lower portion 26 of base cavity 10. Bounce damper 37 is also fastened to terminal 11 at the reverse side thereof from contact 28 and by the same rivet, to provide a slight cushioned movement of contact 28 when the contacts are closed. Contact 27 is the movable contact of the switch and it is riveted to movable leaf spring strip 38. Strip 38 is riveted to terminal 12 at point 39, and a weld is also provided to guarantee electrical conductivity between strip 38 and terminal 12.

By riveting bounce damper 37 on the reverse side of terminal 11 from relatively fixed contact 28, a spring type of cushioning is provided between contact 28 and lower side 40 of rib 41 of the base. The bounce damper 37 comprises a leaf spring having a waved end section which engages, but is not fixed to, the rib side 40. The spring flexes to provide a cushioning action, and also a limited sliding movement of the waved end occurs along rib side 40 to aid in the cushioning action, as the contacts are closed. It has been found that use of this bounce damper materially extends the life of the switch since the contacts are substantially precluded from bouncing open after they have once closed. This results in minimal welding of the contacts and a reduction in contact erosion, which often in the past have presented the problem of restricting the life span of the switch contacts.

At the lower portion of terminal 12 (as viewed in FIG. 2 of the drawing) there is provided an outwardly extending ridge portion 42, the purpose of which is to properly position portion 38a of the contact carrying strip 38, to produce the proper contact pressure or biasing force between contacts 27 and 28.

Insulating base 2 of my switch, as thus has been clearly shown, provides a secure mounting for the contacts 27 and 28 of the switch as well as associated terminals 11 and 12. In addition, base 2 provides convenient external access to and a mounting for the differential adjusting means which varies the snap acting biasing force of toggle spring 30. Furthermore, base 2 also includes fixed stops for limiting the travel of the operating member of the switch.

In addition to the aforementioned features, my base construction has other significant advantage, which will now be discussed. This feature is the unique manner whereby frame 3 is mounted upon insulating base 2, and it constitutes an important aspect of my invention.

Insulating base 2 contains a pair of integral molded ears 43 which project outwardly from the opposite sides 44 and 45 thereof, as best shown in FIGS. 2 and 4. These ears serve as an important part of the mounting means for frame 3, as hereinafter will become apparent. The detailed configuration of these ears is best shown in FIG. 7. As viewed in FIG. 7, each ear includes upper and lower parallel sides 46 and 47 respectively and forward and rear sides 48 and 49 respectively. A lower angular side 50 connects side 48 with side 47. The rear side 49 of each ear is coplanar with and actually forms an outward extension of the associated rear edge 51 or 52 of base 2. The ears 43 and rear edges 51 and 52 of insulating base 2, all serve as a secure supporting means for mounting the switch frame thereupon; but to more completely describe the interengagement between my switch frame and supporting base, a detailed description of the improved construction of the frame is first desirable.

Frame 3 of my invention is very important thereto, and as previously intimated, it offers a multiplicity of advantages. It is generally of U-shaped configuration and is preferably formed by bending a single flat piece of sheet metal into oppositely disposed legs 70 and connecting portion 71. The configuration of frame 3 is best illustrated by the exploded view of FIG. 5. Legs 70 extend generally perpendicular to connecting portion 71 and at their outer ends 73 each leg includes an inwardly bent tab 74, the flange of which is inclined slightly upwardly (as viewed in the drawings) towards connecting portion 71. (See FIGS. 3, 5, and 7.) Adjacent to tabs 74, in each leg 70 there is provided slot 76, which is best shown in FIG. 7. Each slot 76 has generally parallel upper and lower edges 77 and 78 respectively and generally parallel outward and inward edges 79 and 80 respectively which are generally perpendicular to the upper and lower edges. The upper portion of inward edge 80 is stepped inwardly to provide a small step 81. Between each outward edge 79 of slot 76 and lower edge 78 there is an angular edge 82, a portion 83 of which is convexly curved inwardly and faces diagonally, in the general direction of step 81. Extending downwardly and inwardly from the lower edge 84 of each leg 70 of the frame there is tab 85. Outward side edge 86 of each tab 85 is generally aligned with stepped edge 81 on the upper side of each slot 76, as best shown in FIG. 7.

To securely mount my switch frame 3 upon insulating base 2, I have found that cover plate 5a, included in the cover assembly 5, may be conveniently used as a lever. For this purpose, cover plate 5a includes a pair of spaced tongues 87 which are disposed near forward end 88 of the plate and form corner portions thereof. The plate 5a further includes side flanges 89 which extend downwardly from the flat surface 90 of the plate between forward end 88 and rear end 91.

In assembling frame 3 upon base 2, legs 70 of the frame are first pulled slightly apart so that ears 43 of the base may be received within frame slots 76. At this point in the assembly operation, frame 3 rests loosely upon the base 2, with the weight of the frame urging edges 86 of frame tabs 85 against rear edges 51 and 52 of the base, and ears 43 fitting loosely within receiving slots 76. The operating mechanism of the switch is then mounted within the frame, the details of this mechanism to be later described. The cover assembly 5 is thereafter mounted upon the frame. Tongues 87 of cover plate 5a are slipped underneath the inwardly bent tabs 74 of frame legs 70, the inclined configuration of the tab 74 facilitating this step. The rear end 91 of the plate or the vicinity thereof is thereupon pressed downwardly. Side flanges 89 then overlap upper edges 92 of frame 3 to securely retain legs 70 from any outward movement. Rear end 91 of the cover is fastened to connecting portion 71 of the frame by spring clips 93 which shall be described hereinafter.

Tongues 87 of cover plate 5a serve as levers to pry certain edge portions of slots 76 and tabs 85 on each frame leg into firm engagement with base 2. Essentially, this firm engagement amounts to a three-point suspension of each frame leg 70 upon base 2. A first point for this suspension is provided by the engagement of step 81 of slot 76 with an upper part of rear side 49 of ear 43; inwardly convex edge 83 of slot 76 engages a point on lower angular side 50 of ear 43 to furnish a second point of contact; and side edge 86 of the inwardly extending tab 85 of each frame leg, engages rear base edge 51 or 52 to provide a third point of suspension.

A pair of dimples 94 are formed on the lower side of cover plate 5a, to provide points of mounting contact for supporting the cover upon raised portions 95 of base 2. These raised portions 95 project upwardly (as viewed in FIG. 5) from upper surface 96 of the base on opposite sides of central hollow portion 29. The upper surfaces 97 of the tongues 87 of the cover plate contact lower forward edges 98 of tabs 74 forwardly of the raised portions 95, and as the rear end 91 of the cover plate is pressed downwardly upon the frame, the tongues 87 thereby thrust the tabs upwardly from surface 96 the proper distance. Tabs 74 of the frame and tongues 87 of the cover, bend slightly in assembly to facilitate a minimum tolerance build-up, by removing the manufacturing tolerances.

The features of my switch frame and base thus provide a very secure mounting for the frame upon the switch base, which mounting is achieved by a significantly simplified assembly procedure.

Turning now to the operational aspects of my improved switch, to actuate the switch contacts, I have provided contact operating member 100 which includes contact actuating arm 101 riveted thereto at the near side of member 100 as shown in FIG. 5. This operating member is actuated by a temperature responsive bellows 121, in opposition to a range or control spring 120, to operate the switch contacts. To pivotally support contact operating member 100 in frame 3, trapezoidally configured slots 102 are formed in legs 70 between slots 76 and connecting portion 71. Pivoted within slots 102 of the frame are projecting shoulders or trunnions 103 of member 100, which are spaced forward of flanged end 104 as shown in the exploded view of FIG. 5, end 104 being flanged to stiffen the member 100. Each of trunnions 103 has a knife edge 105 which is formed by a rear side sloping downwardly towards end 104. When the shoulders 103 of operating member 100 are mounted in slots 102, knife edges 105 pivot at sharp corners 106 of each slot, thereby providing a precise support for pivotal motion of the operating member. To provide clearance for the outer ends 108 of trunnions 103, each of slots 102 of the frame is disposed in a slightly indented section 107 thereof. When operating member 100 is pivotally mounted in the frame, outermost end 108 of each trunnion 103 has clearance for movement within shallow recess 107a which indented section 107 provides.

Spaced slightly forward from shoulders 103 of operating member 100 are a pair of raised knife edges 109, the purpose of which is to provide accurate pivots for supporting bearing 110 thereon. Bearing 110, as will be later explained, furnishes a means for transmitting bellows force to operating member 100. Knife edges 109 are configured cross-sectionally in the shape of an inverted V, and project inwardly towards the center of opening 111 of the operating member to receive grooves 112 of the bearing. Grooves 112 are also in the configuration of an inverted V so that when bearing 110 pivotally rests upon operating member 100, distinct pivot locations are provided by knife edges 109 of the operating member and the lines of mating contact of grooves 112 adjacent the apexes of grooves 112.

The particular construction of bearing 110 and its arrangement for transmitting force to the operating arm comprises the invention of Richard W. Cobean, and this construction and arrangement are described and claimed in his copending application Serial Number 818,437 filed concurrently herewith and assigned to the same assignee as the present invention. As shown, the bearing 110 includes upper shoulders 113 within which aforementioned grooves 112 are formed, depending parallel pairs of struts 114, and base 115. To provide a force transmitting seat for altitude adjusting screw 116, cup shaped recess 117 is formed in base 115, and it has a slightly flattened annular seat 118 upon which shoulder portion 119 of screw 116 rests. The primary function of bearing 110 is to transmit the difference force between range spring 120 and bellows 121 to the operating member 100, and the operation thereof shall become more readily apparent hereinafter as my description progresses.

To insure that the inner portions of pivoting knife edges 105 of the operating member have ample room to pivot within their mating slots 102 of frame 3, and minimize frictional contact between side edges 123 and 124 and the frame, the outer ends 108 of trunnions 103 are made oblique to the length thereof. Operating member 100 is thus widest approximately at the ends 105a of knife edges 105 so that ends 105a locate the operating member between sides 171 of the bellows cup 170. (See FIG. 4.) To locate the operating member between frame legs 70 before mounting the bellows assembly thereto, curved protuberances 122a and 122b are formed on the edges 123 and 124 of the operating member. Spaced forwardly from protuberance 122a, and adjacent edge 123 of the operating member, manual stop extension 125 projects upwardly in a direction generally perpendicular to the face of the operating member. Upwardly directed point 126 is provided on this extension to contact a manually adjustable control means for opening the switch contacts.

To provide a means for continually biasing operating member 100 in the direction of the closed position of the switch contacts, or with a continuous clockwise moment of biasing force about knife edges 105, as shown in FIG. 3, I have provided the previously mentioned U-shaped toggle spring 30. As best shown in FIGS. 3 and 5, toggle spring 30 has indented end portions 127 and 128 for mounting the spring in continuous compression between pivot member 32 and operating member 100, respectively. Knife edge 129 is formed in the forward end of member 100 to engage indented portion 128 of the toggle spring, and thereby receive the transmission of continuous biasing force of the toggle spring.

To support the indented or pivoting edge 127 of toggle spring 30, pivot member 32 has a central knife edge 130 which inclines slightly downwardly (as viewed in FIG. 5) to engage indented portion 127 of the spring, forming a knife edge contact therewith. At each end of pivot member 32 a pair of spaced doubly bent fingers 131 extend outwardly. These fingers 131 specifically are formed at the corners of the member 32, and together with body surface 132 they provide bearing surfaces for sliding movement of member 32. In particular, the fingers fit within channels 31 of the base, which serve as guides for the sliding movement. On the side opposite to downwardly inclined knife edge 130, pivot member 32 has an upwardly extending central flange 133 engaged by the leading or forward end 134 of differential adjusting screw 33. Externally accessible screw 33 engages knurled nut 34 which has been pressed into base 2, and by manual rotation of the screw it may be moved toward or away from the toggle spring 30. By means of the leading end 134 of the screw engaging flange 133 of the pivot member 32, the compression of the toggle spring 30 may be adjusted by the knife edge contact between edge 130 of the pivot member and indented pivoting edge 127 of the toggle spring. Channels 31 serve to guide the movement of the sliding pivot member so that pivoting edge 127 of the toggle spring is moved horizontally (as viewed in FIG. 3) with a linear motion. Axial movement of screw 33 thus varies the biasing force supplied by the toggle spring and thereby varies the temperature differential of the control switch, while pivot member 32 within channels 31 precludes any significant vertical movement of the pivoting edge 127 of the toggle spring. Different thicknesses of toggle springs may be utilized in various switches, to provide the range of temperature differentials which is required.

As previously noted, base 2 has molded therein fixed stops 35 and 36 which are provided for limiting the upward and downward movement of operating member 100 between two fixed points. By limiting the movement of the operating member between these stops, the possibility of reaching the limits of the particular toggle spring is thereby precluded, the biasing force provided by the toggle spring being within the most desirable range of the spring potential.

The combination of my limiting stops 35 and 36 coupled with the differential adjustment of toggle spring 30 by linearly guided movement of pivot member 32 with its variably positioned knife edge point of contact, provides a substantially improved tolerance control over the "offset" of the spring. In designing toggle springs for use in switches such as those incorporating my invention, the quality known as "offset" is an important characteristic which it is most desirable to control. "Offset" may be explained in my switch as the distance which a line between the indented pivoting edge 127 of the toggle spring 30 and the operating member pivots 105 is displaced from the point of engagement of the operating member with the movable indented edge 128 of the toggle spring. The stops 35 and 36 together with the positive linear adjustment of the pivoting edge 127 of the toggle spring, provide a very close control of the "offset" of the toggle spring of my switch in both positions of the spring. By this improved control, I thereby achieve lower offset distances for the toggle spring, resulting in higher switch energy for a given set of parts.

To provide a continuous downward biasing force upon bearing 110, and therefore a continuous counterclockwise moment of biasing force upon operating member 100 about pivoting knife edges 105, I have utilized the previously referred to range spring 120. Range spring 120 transmits its compressive force to altitude screw 116 via nut 135 which is threaded on screw 116. To provide relatively precise seating contact, upper end 120a and lower end 120b of spring 120 are ground square. Lower end 120b of the spring rests upon upper annular flange surface 135a of altitude nut 135, and upper end 120a of the spring bears upon lower annular surface 136 of cam follower eyelet 137.

By varying the compression of range spring 120, the temperature level at which my cold control operates may be adjusted. To effect this variation, I provide manually adjustable cam 138 which is rotatably mounted on cover plate 5a by shaft 142, and engages pivotally mounted cam follower 139. Follower 139 is responsive to the rotary position of cam 138, and cam follower eyelet 137 is pivotally mounted thereon. Cam 138 may be constructed of die cast zinc and includes gradual sloping portion 140, and abrupt sloping portion 140a, as best shown in FIG. 3. These sloping portions 140 and 140a of cam 138 serve to provide a manual adjustment for the compression of range spring 120 by rotary engagement with curved extension 141 of cam follower 139. To facilitate the manual rotation of cam 138, shaft 142 is secured thereto by some suitable means such as a press fit. Most of the cam is disposed within circular recess 143 which is formed within raised annulus 144 of cover plate 5a, as shown best by FIG. 3. An annular shoulder portion 145 of cam 138 extends upwardly through an aperture 146 in the cover plate and key projection 147 of the cam enters a mating slot of a knob mounting adapter 148 which is affixed to knurled neck 142a of shaft 142. Spring washer 148a is positioned between adapter 148 and the upper surface area of the plate immediately surrounding aperture 146. To provide a limiting stop for the rotation of cam 138, downwardly lanced portion 144a projects slightly into recess 143, to engage lateral extension 149 of cam 138. Extension 149 also serves to contact rearward facing surface 126a of point 126 on extension 125 of operating member 100, to provide a "manual-off" pivoting movement of operating member 100 and thus open the switch contacts.

Cam follower 139 of my switch is pivotally mounted in connecting portion 71 of frame 3 by means of fingers 150 which are bent perpendicularly upward (as viewed in FIG. 5) and engage the upper edges 151a of spaced slots 151 of connecting portion 71. Sharp inner edges 152 are formed at the base of fingers 150. To provide a slight upward biasing of inner edges 152 of fingers 150 against upper edges 151a about which the cam follower pivots, spring tab 153 is provided in frame connecting portion 71. Tab 153 is bent slightly inwardly and then outwardly from connecting portion 71 and furnishes a spring biasing force against cam follower 139 by engaging central nose 154 thereof. The nose 154 specifically engages and is biased by inwardly extending angular shoulder portion 153a of the tab 153.

Cam follower 139 also includes a pair of spaced ridges 155 on its underside which extend downwardly, as best shown in FIG. 3, to pivotally support cam follower eyelet 137 thereon. Upwardly extending tabs 156 of eyelet 137 are received by spaced slots 157 at the outer ends of ridges 155, and then turned outwardly to pivotally mount the eyelet on the ridges 155 of the undersurface of the cam follower. (See FIG. 4.)

To provide access to range screw 116, apertures 158 and 159 are provided in the cam follower 139 and cover plate 5a respectively and these apertures are in alignment with the altitude screw 116 so that a presetting adjustment may be made of the range spring compression by adjusting the relationship of altitude screw 116 with its associated nut 135, after the control switch is assembled.

For mounting switch 1 to a suitable supporting panel, mounting extensions 160 are provided at each end of cover plate 5a. Each extension includes a threaded aperture 161 to engage a suitable mounting screw.

Turning now to the bellows assembly 4 of my switch, which I have chosen as a typical condition responsive means, I have provided bellows cup or housing 170 for supporting and containing bellows 121. Bellows cup 170 includes upwardly extending flanged sides 171 for straddling the lower portion of frame legs 70. Sides 171 cover the lower portion of shallow recesses 107a (as viewed in FIG. 4) to protect the outer ends 108 of trunnions 103 of the operating member. To securely mount bellows cup 170 upon frame 3, a pair of spaced toes 172 extend outwardly from inner end 173 of the cup to engage tabs 85 of the frame by conveniently slipping underneath. Tabs 85 of the frame thus serve the twofold purpose of both engaging the base to help mount the frame thereon, and receiving toes 172 of the bellows cup 170 to help mount the bellows assembly thereon. For locking the bellows assembly rigidly against lower edge 84 of each frame leg, a pair of spaced slots 174 are provided, each of which is adjacent to outer end 175 and sides 171. Adjacent to rear end 91 of cover plate 5a a pair of spaced laterally extending indentations 91a are formed in the upper surface thereof. For rigidly clamping rear end 91 of cover plate 5a and outer end 175 of bellows cup 170 against upper edge 176 and lower edge 177 respectively of frame connecting portion 71, I utilize two spring clips 93 each of which compresses the adjacent ends of cover plate 5a and bellows cup 170 against the edges of connecting portion 71, by engaging an indentation 91a of the cover and an oppositely disposed slot 174 of the bellows cup. This is best shown in FIG. 3. Upper rear tongues 92a may also be formed on legs 70 of the frame near connecting portion 71 to serve as positioning guides for the cover. These tongues may also be bent over to additionally secure the end of the cover plate to the frame, but this is not at all necessary. The spring clips 93 are thereby utilized to both rigidly secure and lock the cover assembly and the bellows assembly against the frame.

For insuring the alignment of outer end 175 of the bellows cup with lower edge 177 of frame connecting portion 71, spaced tabs 178 project downwardly from the lower edge 177, and their inner faces 178a enter squared recesses 179 which are adjacent to the outer end 175 of the bellows cup.

Bellows cup 170 also includes a depending flange 180 with projecting arm 181 extending therefrom for supporting capillary 182. Capillary 182 is connected to a suitable bulb 183 and contains a thermally responsive fluid such as methyl chloride or dichlorodifluoromethane.

For furnishing the temperature responsive actuating force for the switch, bellows 121 is mounted within the bellows cup 170. A restraining annulus 184 having supporting arms fitted into an annular groove in the inner wall of the bellows cup, restricts the upward movement of bellows 121. To provide the transmission area for the temperature responsive force, bellows 121 has a central cup-shaped recess 121a within which a smaller recess 121b is also contained. Recess 121b has an upwardly projecting nose centrally disposed therein, which bears against lower tip 116a of altitude screw 116. Altitude screw 116 also receives the downward biasing force of range spring 120 and transmits the difference of the forces of spring 120 and bellows 121 to bearing 110 and the operating member 100. More specifically, as mentioned above, shoulder 119 of altitude screw 116 transmits the difference force to bearing 112 by engagement with flattened annular seat 118 thereof.

Frame 3 of switch 1 also includes drainage holes 185 in each leg 70, the purpose of which is to provide for the drainage of any condensation which collects within the switch.

Considering now the operation of the improved condition responsive switch mechanism which I have disclosed, let us first assume that my switch is utilized with a refrigeration machine, to control the compressor unit thereof by means of opening and closing its electrical contacts in response to bulb or capillary temperature. Assuming that the bulb 183 or capillary 182 is at a temperature slightly above the "on" temperature of the cold control, the contact operating member 100 would then be in the position 100a, as shown by the dotted lines of FIG. 3, with the contacts biased to their normally closed position. At this position, the load on operating member 100 at knife edge pivot points 109 is low, being only enough to maintain engagement of the bearing with the operating member and altitude screw at knife edges 109 and shoulder 119 respectively. At this time, the bellows force is nearly equal to the range spring force, and the toggle spring 30 is holding the operating arm against stop 35. Toggle spring 30, which is shown by dotted line 30a, is then in a position off of dead center its maximum distance. It therefore, supplies its maximum biasing force against knife edge 129 of operating member 100. Bearing 110 can swivel about shoulder 119 of altitude screw 116 as necessary, to maintain a unique engagement at knife edges 109 and shoulder 119, and to transmit the difference of the range spring force and the bellows force to the operating member as a force moment about pivoting knife edges 105 of the operating member. This force moment, as above indicated, is relatively low.

With the compressor of the refrigerating machine then in operation due to the contacts of the switch being closed, substantial cooling in the vicinity of the bulb or capillary tube of the bellows assembly ensues. As the compressor pulls down the temperature, the capillary or bulb senses this dropping temperature and consequently causes the temperature responsive fluid contained therein to decrease the internal vapor pressure on the bellows. The force exerted upwardly upon range screw 116 by the bellows thus gradually decreases, and the temperature drop causes an increasing resultant downward force to be exerted upon pivot points 109 by range spring 120. In other words, bearing 110 exerts a force moment upon operating member 100 at knife edges 109 of member 100 which is determined by the difference between the forces of the range spring and the bellows. Toggle spring 30 exerts a continuous biasing force upon knife edge 129 of operating member 100, and this force has a clockwise moment about pivot points 105 of the contact operating member (as viewed in FIG. 3). When the temperature reaches a point where the counterclockwise moment of the force transmitted to pivots 109 by bearing 110 just exceeds the clockwise moment of the toggle spring biasing force at knife edge 129 of operating member 100, the operating member 100 snaps to the solid or lower position as shown in FIG. 3. The contacts are thus opened, by the downward movement of pin 101a of actuating arm 101 against an extension 38b of leaf spring strip 38 which carries movable contact 27. With the contacts open, the circuit to the compressor motor is opened, to interrupt the cooling operation.

With the contacts open, toggle spring 30 is a minimum distance off of its dead center position, and it produces a slight but definite clockwise biasing force upon the operating member. As the temperature of the capillary or bulb then starts to increase, the vaporization of some of the fluid therein causes the bellows internal pressure to increase accordingly. At first the bellows will not move because the force of the range spring is sufficiently greater than the opposing force of the bellows. But with further temperature increase in the vicinity of the capillary or bulb, the bellows internal pressure increases until the bellows force becomes more nearly equal to the range spring force, and the counterclockwise moment of the difference force is exceeded by the small clockwise moment of the toggle spring biasing force. At this point, the spring 30 toggles the contact operating member to its upper position. This, of course, allows the contacts to move to the "on" position and again energizes the circuit to the compressor.

To adjust the differential temperature of the control switch, that is, to adjust the difference between the "on" and "off" temperatures of the control, one needs merely to rotate the differential adjusting screw 33 which is externally accessible from the terminal side of insulating base 2.

For varying the temperature levels at which the switch is responsive to open and close its contacts, shaft 142 is rotated. This changes the position of cam 138 and thereby varies the compression on range spring 120. Turning the shaft 142 in a counterclockwise direction causes the cam slopes 140 and 140a to move over raised surface 141 of the cam follower and thereby variably deflect the cam follower 139 and pivoted eyelet 137, to gradually increase the compression upon range spring 120. Increasing the range spring compression means that added bellows pressure is required for operating member 100 to toggle to the "on" position, and therefore increases the temperature level at which the contacts of the cold control will respond. The rotation of the shaft 142 in other words raises or lowers the "on" and "off" temperature together, while not materially affecting the differential therebetween.

For conveniently presetting the force of range spring 120, a factory or shop adjustment of altitude screw 116 may be made.

In assembling my cold control switch, I preferably utilize several sub-assembly operations, followed by the main assembly procedure.

A base sub-assembly is achieved by mounting the fixed and movable contacts 28 and 27, supporting spring strip 38, and the associated terminals 11 and 12 on insulating base 2. Knurled nut 34 is pressed into its position in the base, and differential adjusting screw 33 is threaded into engagement therewith.

A cover sub-assembly is put together by first inserting lubricated cam 138 in aperture 146 of cover plate 5a. Spring washer 148a and knob adapter 148 are then placed on the outer side of the cover around projecting portion 145 of cam 138 and shaft 142 is press fitted into the cam to retain cam 138, washer 148a and adapter 148 on the cover. The inserted portion of shaft 142 is knurled (not shown) to provide torsional resistance and the lower lip of the shaft is slightly staked to preclude the possibility of its being pulled loose.

Sub-assemblies are also provided for the range spring 120, altitude adjusting screw 116 and associated nut 135; contact operating member 100 with actuating arm 101 riveted thereto; and the cam follower 139 with eyelet 137 staked thereto.

Bellows assembly 4 has also been constructed prior to my main assembly operation.

My main assembly operation for this cold control switch then is commenced by the sliding of pivot member 32 into channels 31 of the base 2 so that flange 133 thereof engages the forward end 134 of screw 33. Insulator 2a may also be used to close lower opening 26 of base cavity 10. Toggle spring 30 is then held with one of its indented edges in contact with knife edge 130 of pivot member 32, and frame 3 with pivoted operating member 100 mounted thereon is placed on the base by slightly parting legs 70 so that ears 43 of the base are received within slots 76 of the frame. Concurrently, knife edge 129 of the operating member is engaged with the other indented edge of toggle spring 30. Bearing 110 is then dropped in position on the edges 109 of the operating member and the altitude adjusting assembly is added thereto. The cam follower sub-assembly, consisting of cam follower 139 with pivotally attached eyelet 137 is then pivotally mounted on connecting portion 71 of frame 3, so that lower annular surface 136 of pivoted eyelet 137 rests on the upper shoulder of range spring 120. The cover sub-assembly 5 is then slipped into position with tongues 87 underneath tabs 74 of the frame. Downward pressure exerted at the rear end of cover plate 5a seats the cover assembly in position on the frame with side flanges 89 thereof overlapping upper edges 92 of the frame, and with the edges of the cover plate 5a bridging between lower edges 98 of tabs 74 and upper rear shoulders 92b of frame legs 70. Bellows assembly 4 may then be mounted on the frame. To mount the bellows assembly, spaced tabs 172 thereof are positioned under tabs 85 of the frame. Clips 93 are then placed between indentations 91a of cover plate 5a and slots 174 of bellows cover 170, and the cover assembly 5 is thereby locked to bellows assembly 4 about connecting portion 71 of the frame. This completes the assembly operation of my cold control switch with only the differential and altitude screw adjustments remaining to be made before the control is ready for service.

The simplicity of this improved switch permits the overall dimensions to be small compared to other prior devices. For instance, in a cold control constructed in accordance with this invention, for controlling a two horsepower compressor, the device has an over-all length of 2 5/16 inches, a width of 1 5/32 inches, and a height of 1 7/16 inches, excluding the shaft.

While in accordance with the patent statutes, I have described what at present is considered to be the preferred embodiment of my invention, it will be obvious to those skilled in the art that various changes and modifications may be made therein without departing from the invention, and I, therefore, aim in the following claims to cover all such equivalent variations as fall within the true spirit and scope of the invention.

What I claim as new and desire to secure by Letters Patent of the United States is:

1. A condition responsive electric switch comprising an insulating base having a pair of ears formed on opposite sides thereof, at least one contact mounted on said insulating base, a U-shaped frame having two legs and a connecting portion therebetween, each of said legs having a tab and a slot formed adjacent the outer end thereof, the ends of said legs fitting over said sides of said base with said slots receiving said ears and with said tabs engaging an end of said base, thereby to mount said frame on said base, contact operating means carried by said frame, external condition responsive means carried by said frame for actuating said operating means, and a cover engaging said frame and pulling said tabs against said base and points of said slots against said ears thereby to clamp said frame securely to said base.

2. A condition responsive electric switch comprising an insulating base having a pair of ears formed on opposite sides thereof, at least one contact mounted on said insulating base, a U-shaped frame having two legs and a connecting portion, each of said legs having first and second tabs and a slot formed adjacent the outer end thereof, the ends of said legs fitting over said sides of said base with said slots receiving said ears and with said first tabs engaging an end of said base, thereby to mount said frame on said base, contact operating means carried by said frame, external condition responsive means carried by said frame for actuating said operating means, and a cover having corner portions at one end which are received by said second tabs, said cover engaging said frame and applying an outward thrust to said second tabs to pull said first tabs against said base and points of said slots against said ears thereby to clamp said frame securely to said base.

3. A condition responsive electric switch comprising an insulating base having a pair of ears formed on opposite sides thereof and an upper surface between said sides, said upper surface having a raised portion, a pair of contacts mounted on said insulating base, a U-shaped frame having two legs and a connecting portion, each of said legs having first and second tabs and a slot formed adjacent the outer end thereof, the ends of said legs fitting over said sides of said base with said slots receiving said ears and with said first tabs engaging an end of said base, thereby to mount said frame on said base, contact operating means carried by said frame, external condition responsive means carried by said frame for actuating said operating means, and a cover having corner portions at one end which are received by said second tabs, said cover engaging said raised portion of said base and applying an upward force to said second tabs thereby to pull said first tabs against said base and points of said slots against said ears to clamp said frame securely to said base.

4. A condition responsive electric switch comprising an insulating base having a pair of ears formed on opposite sides thereof, a pair of contacts mounted on said insulating base, a U-shaped frame having two legs and a connecting portion, each of said legs having a tab and a slot formed adjacent the outer end thereof, the ends of said legs fitting over said sides of said base with said slots receiving said ears and with said tabs engaging an end of said base, thereby to mount said frame on said base, contact operating means carried by said frame, external condition responsive means for actuating said operating means, a housing for said external condition responsive means, one end of said housing being received by said tabs and the other end of said housing being secured to said frame adjacent to said connecting portion thereof, and a cover engaging said frame and pulling said tabs against said base with points of said slots against said ears, thereby to clamp said frame securely to said base.

5. A condition responsive electric switch comprising an insulating base having a pair of ears formed on opposite sides thereof, a pair of contacts mounted on said insulating base, a U-shaped frame having two legs and a connecting portion, each of said legs having first and second tabs and a slot formed adjacent the outer end thereof, the ends of said legs fitting over said sides of said base with said slots receiving said ears and with said first tabs engaging an end of said base, thereby to mount said frame on said base, contact operating means carried by said frame, a cover having corner portions at one end which are received by said second tabs, said cover engaging said second tabs to pull said first tabs against said base and points of said slots against said ears thereby to clamp said frame securely to said base, external condition responsive means carried by said frame for actuating said contact operating means, and a supporting housing for said condition responsive means, one end of said housing being received within said first tabs, the other end of said housing being directly opposite the other end of said cover with the connecting portion of said frame therebetween, and a spring clip means for securely pressing the ends of said cover and said housing adjacent to said connecting portion of said frame against said connecting portion.

6. A condition responsive electric switch comprising an insulating base having a pair of ears formed on opposite sides thereof, a pair of contacts mounted on said insulating base, a U-shaped frame having two legs and a connecting portion, each of said legs having first and second tabs and a slot formed adjacent the outer end thereof, the ends of said legs fitting over said sides of said base with said slots receiving said ears and with said first tabs engaging an end of said base, thereby to mount said frame on said base, contact operating means carried by said frame, a cover having corner portions at one end which are received by said second tabs and spaced indented grooves adjacent the other end thereof, said cover applying a force to said second tabs to hold said first tabs against said base and points of said slots against said ears, thereby to clamp said frame securely to said base, external condition responsive means carried by said frame for actuating said contact operating means, and a housing for said condition responsive means, one end of said housing received within said first tabs, the opposite end of said housing having spaced slots adjacent the edge thereof and being positioned directly opposite the end of said cover having spaced indented grooves with the connecting portion of said frame therebetween, and spring clip means extending between and engaging said slots and said grooves for securely pressing the grooved end of said cover and the slotted end of said housing against the connecting portion of said frame.

References Cited in the file of this patent

UNITED STATES PATENTS

| | | |
|---|---|---|
| 2,303,910 | Clark et al. | Dec. 1, 1942 |
| 2,318,553 | Raney | May 4, 1943 |
| 2,480,937 | Kuhn | Sept. 6, 1947 |
| 2,511,640 | Kuhn | June 13, 1950 |
| 2,665,353 | Popp | Jan. 5, 1954 |
| 2,691,084 | Miller | Oct. 5, 1954 |
| 2,738,397 | Slonneger | Mar. 13, 1956 |
| 2,761,937 | Ericson | Sept. 4, 1956 |
| 2,783,334 | Garner | Feb. 26, 1957 |
| 2,798,925 | Few et al. | July 9, 1957 |
| 2,813,176 | Miller | Nov. 12, 1957 |
| 2,853,583 | Rauh | Sept. 23, 1958 |